(12) United States Patent
Hayes

(10) Patent No.: US 12,393,036 B2
(45) Date of Patent: *Aug. 19, 2025

(54) DISPLAY DEVICE WITH OPTICAL WAVEGUIDE AND PROJECTOR

(71) Applicant: Snap Inc., Santa Monica, CA (US)

(72) Inventor: David Hayes, Robertsbridge (GB)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/768,338

(22) Filed: Jul. 10, 2024

(65) Prior Publication Data

US 2024/0361604 A1    Oct. 31, 2024

Related U.S. Application Data

(63) Continuation of application No. 17/561,081, filed on Dec. 23, 2021, now Pat. No. 12,072,495.

(Continued)

(51) Int. Cl.
*G02B 27/01* (2006.01)
*G02B 6/34* (2006.01)
(Continued)

(52) U.S. Cl.
CPC .......... *G02B 27/0172* (2013.01); *G02B 6/34* (2013.01); *G02B 27/0176* (2013.01);
(Continued)

(58) Field of Classification Search
None
See application file for complete search history.

(56) References Cited

U.S. PATENT DOCUMENTS 9,132,342 B2 * 9/2015 Balachandreswaran ..................... A63F 13/327
9,480,919 B2 * 11/2016 Kalaboukis ............. G06F 3/012
(Continued)

FOREIGN PATENT DOCUMENTS

CN    116670567 A    8/2023
GB    2529003 B      8/2020
(Continued)

OTHER PUBLICATIONS

U.S. Appl. No. 17/561,081, filed Dec. 23, 2021, Display Device With Optical Waveguide and Projector.
(Continued)

*Primary Examiner* — Fred Tzeng
(74) *Attorney, Agent, or Firm* — Schwegman Lundberg & Woessner, P.A.

(57) ABSTRACT

A display device for use in displaying an augmented reality image of a real-world view or a virtual reality image. The display device comprises an optical waveguide having an input optical element for receiving an image and at least one output optical element for outputting the image, a projector for generating the image, the projector being physically coupled to the optical waveguide, and a projector housing containing at least some components of the projector. The projector housing is moveable with respect to the optical waveguide. The projector housing contains the at least some components of the projector so that the image generated by the projector is fixed relative to the projector housing. The projector includes an image processor to correct the image generated by the projector and received by the input optical element of the optical waveguide dependent on a position of the projector housing relative to the optical waveguide.

20 Claims, 10 Drawing Sheets

Related U.S. Application Data

(60) Provisional application No. 63/199,427, filed on Dec. 27, 2020.

(51) Int. Cl.
*H04N 9/31* (2006.01)
*G06F 1/16* (2006.01)

(52) U.S. Cl.
CPC ... *H04N 9/3185* (2013.01); *G02B 2027/0161* (2013.01); *G06F 1/163* (2013.01)

(56) References Cited

U.S. PATENT DOCUMENTS

| | | | |
|---|---|---|---|
| 9,520,072 B2 * | 12/2016 | Sun | G09B 23/30 |
| 9,740,006 B2 | 8/2017 | Gao | |
| 10,108,013 B2 | 10/2018 | Wall et al. | |
| 10,254,546 B2 * | 4/2019 | Poulos | G02B 27/0172 |
| 10,311,644 B2 | 6/2019 | Rodriguez, II | |
| 10,339,718 B1 | 7/2019 | Kamal et al. | |
| 10,482,327 B1 | 11/2019 | Ouimet et al. | |
| 10,607,053 B1 | 3/2020 | Boyd et al. | |
| 10,627,565 B1 | 4/2020 | Trail | |
| 10,663,731 B2 | 5/2020 | Son et al. | |
| 10,670,805 B2 * | 6/2020 | Tervo | G02B 6/34 |
| 10,996,476 B2 | 5/2021 | Maimone et al. | |
| 11,029,523 B2 | 6/2021 | Travers | |
| 11,054,647 B1 | 7/2021 | Lin et al. | |
| 11,113,889 B1 | 9/2021 | Castañeda et al. | |
| 11,125,993 B2 | 9/2021 | Pennell et al. | |
| 11,169,374 B1 | 11/2021 | Kubala et al. | |
| 11,209,650 B1 | 12/2021 | Trail | |
| 11,215,827 B1 | 1/2022 | Zhang | |
| 11,614,585 B2 * | 3/2023 | Huang | G02B 6/00 385/37 |
| 11,662,582 B2 | 5/2023 | Li et al. | |
| 11,666,825 B2 * | 6/2023 | Delamont | G06T 19/006 463/32 |
| 11,668,930 B1 | 6/2023 | Pennell et al. | |
| 2010/0103075 A1 * | 4/2010 | Kalaboukis | A63F 13/90 345/8 |
| 2010/0149073 A1 | 6/2010 | Chaum et al. | |
| 2012/0142415 A1 * | 6/2012 | Lindsay | G06T 19/006 463/33 |
| 2013/0044128 A1 * | 2/2013 | Liu | G02B 27/017 345/633 |
| 2013/0322810 A1 | 12/2013 | Robbins | |
| 2014/0153103 A1 | 6/2014 | Gupta | |
| 2015/0062715 A1 | 3/2015 | Yamada et al. | |
| 2015/0168731 A1 | 6/2015 | Robbins | |
| 2017/0045746 A1 | 2/2017 | Ellsworth et al. | |
| 2018/0157051 A1 | 6/2018 | Sahlsten et al. | |
| 2018/0249151 A1 | 8/2018 | Freeman et al. | |
| 2019/0005733 A1 * | 1/2019 | Wehner | G06T 7/20 |
| 2019/0250407 A1 | 8/2019 | Della Nave et al. | |
| 2020/0012031 A1 | 1/2020 | Mukawa | |
| 2020/0150405 A1 | 5/2020 | Bates et al. | |
| 2020/0278554 A1 | 9/2020 | Schultz et al. | |
| 2021/0132387 A1 | 5/2021 | Stevens et al. | |
| 2021/0231953 A1 | 7/2021 | Rodriguez, II et al. | |
| 2021/0239982 A1 | 8/2021 | Valera | |
| 2021/0256773 A1 | 8/2021 | Hare et al. | |
| 2021/0304450 A1 | 9/2021 | Smith et al. | |
| 2021/0304507 A1 | 9/2021 | Smith et al. | |
| 2021/0306386 A1 | 9/2021 | Smith et al. | |
| 2021/0306387 A1 | 9/2021 | Smith et al. | |
| 2021/0319625 A1 | 10/2021 | Goodrich et al. | |
| 2021/0390784 A1 | 12/2021 | Smith et al. | |
| 2022/0206304 A1 | 6/2022 | Hayes | |
| 2023/0161163 A1 * | 5/2023 | Leighton | G02B 27/0172 385/37 |

FOREIGN PATENT DOCUMENTS

| | | |
|---|---|---|
| WO | WO-2008081070 A1 | 7/2008 |
| WO | WO-2022136638 A1 | 6/2022 |

OTHER PUBLICATIONS

"U.S. Appl. No. 17/561,081, Examiner Interview Summary mailed Feb. 2, 2024", 2 pgs.

"U.S. Appl. No. 17/561,081, Examiner Interview Summary mailed Mar. 25, 2024", 2 pgs.

"U.S. Appl. No. 17/561,081, Final Office Action mailed Feb. 29, 2024", 6 pgs.

"U.S. Appl. No. 17/561,081, Non Final Office Action mailed Jan. 22, 2024", 6 pgs.

"U.S. Appl. No. 17/561,081, Notice of Allowance mailed Apr. 10, 2024", 8 pgs.

"U.S. Appl. No. 17/561,081, Response filed Feb. 22, 2024 to Non Final Office Action mailed Jan. 22, 2024", 10 pgs.

"U.S. Appl. No. 17/561,081, Response filed Mar. 26, 2024 to Final Office Action mailed Feb. 29, 2024", 8 pgs.

"Chinese Application Serial No. 202180066542.7, Voluntary Amendment filed Dec. 8, 2023", W/English Translation, 8 pgs.

"International Application Serial No. PCT/EP2021/087480, International Search Report mailed Apr. 20, 2022", 4 pgs.

"International Application Serial No. PCT/EP2021/087480, Written Opinion mailed Apr. 20, 2022", 6 pgs.

"U.S. Appl. No. 17/561,081, Supplemental Notice of Allowability mailed Jul. 24, 2024", 2 pgs.

"Chinese Application Serial No. 202180087573.0, Voluntary Amendment filed Dec. 8, 2023", W/English Translation, 8 pgs.

"Korean Application Serial No. 10-2023-7025115, Notice of Preliminary Rejection mailed Nov. 7, 2024", w/ English translation, 8 pgs.

"Korean Application Serial No. 10-2023-7025115, Response filed Jan. 7, 2025 to Notice of Preliminary Rejection mailed Nov. 7, 2024", w/ English Claims, 21 pgs.

"Korean Application Serial No. 10-2023-7025115, Voluntary Amendment filed Jun. 5, 2024", w/ English claims, 18 pgs.

* cited by examiner

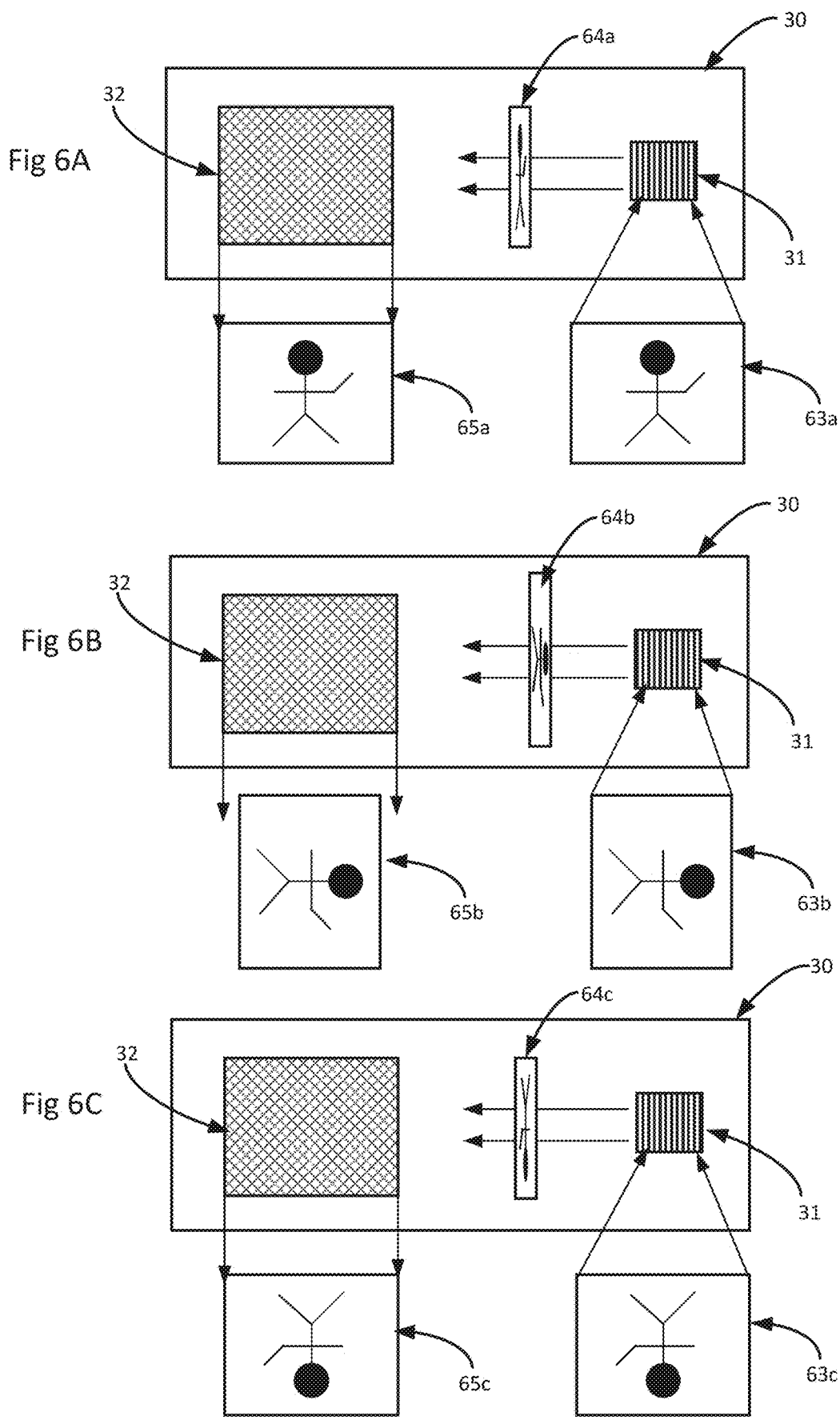

DISPLAY DEVICE WITH OPTICAL WAVEGUIDE AND PROJECTOR

CROSS-REFERENCE TO RELATED APPLICATIONS

This application is a continuation of U.S. patent application Ser. No. 17/561,081 filed Dec. 23, 2021, which claims priority to U.S. provisional patent application Ser. No. 63/199,427 filed Dec. 27, 2020, which are incorporated herein by reference in their entirety.

FIELD

The present disclosure relates generally to a display device comprising a projector and a waveguide for displaying an augmented reality image of a real-world view or a virtual reality image to a user.

BACKGROUND

Imaging waveguides can be used to present projected information to the eye of an observer in a head mounted display arrangement. In one instance where the waveguide is provided within an occluded housing, no light from the real-world is permitted to enter and pass through the waveguide. As such, in this configuration the waveguide would be considered as a virtual reality arrangement. Essentially the waveguide functions as a monitor or display with a relaxed viewing distance and a large eyebox.

In another configuration a waveguide may be provided in an un-occluded housing, where light from the real-world can pass through the waveguide to the eye of a viewer. When no light is directed into the waveguide from the projector, a user would simply observe the real-world through the waveguide. When a projector actively introduces light into the waveguide, such introduced light may be mixed or combined with light from the real-world to form an augmented reality experience, in which a viewer will see projected images superimposed on the real-world.

Prior art devices exist which either operate solely as virtual reality displays, such as for example the Oculus Rift® from Facebook®, or solely as augmented reality displays, such as HoloLens® from Microsoft®, however no device can be user selectable to operate as either a virtual reality display or an augmented reality display.

SUMMARY

The present invention provides a method and system as defined in the appended claims.

In one aspect the present invention provides a display device for use in displaying an augmented reality image of a real-world view or a virtual reality image to a user, the display device comprising an optical waveguide having an input optical element for receiving an image and at least one output optical element for outputting the image, a projector for generating the image, the projector being physically coupled to the optical waveguide and a projector housing containing at least some components of the projector, the projector housing being relatively moveable with respect to the optical waveguide between a relative position in which a real-world view through the optical waveguide in the region of the at least one output optical element is occluded and a relative position in which the real-world view through the optical waveguide in the region of the at least one output optical element is not occluded.

BRIEF DESCRIPTION OF DRAWINGS

Various ones of the appended drawings merely illustrate example embodiments of the present invention and cannot be considered as limiting its scope.

FIGS. 6A, 6B and 6C illustrate orientations of the input image and the output image according to different arrangements of one display device configuration;

DETAILED DESCRIPTION

Figure 1A:
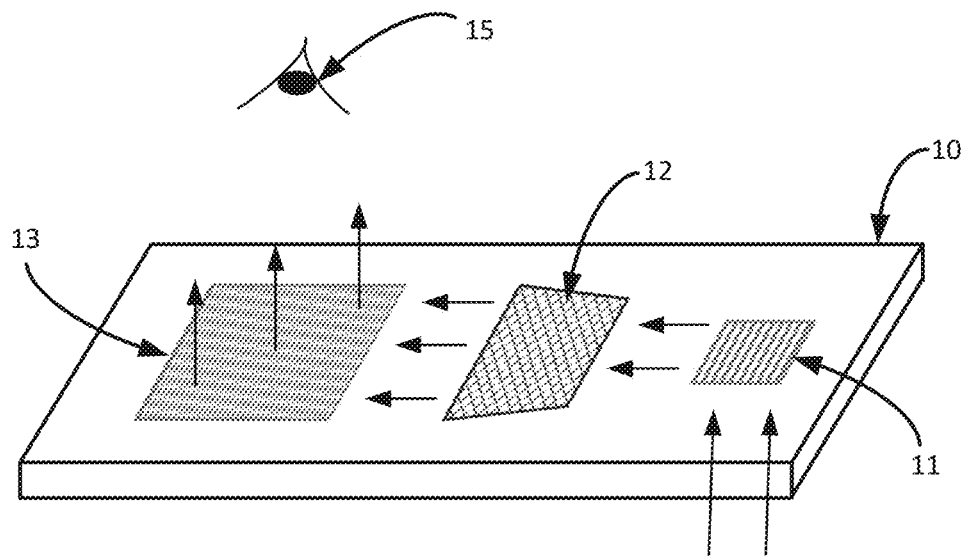
FIGS. 1A and 1B illustrate an optical waveguide configuration for use in an example display device.

The description that follows includes devices, methods, and techniques that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known structures, and techniques have not been shown in detail.

A generalized display device for use in displaying an augmented reality image of a real-world view or a virtual reality image to a user comprises an optical waveguide having an input optical element for receiving an image and at least one output optical element for outputting the image, a projector for generating the image, the projector being physically coupled to the optical waveguide, and a projector housing containing at least some components of the projector, the projector housing being relatively moveable with respect to the optical waveguide between a relative position in which a real-world view through the optical waveguide in the region of the at least one output optical element is occluded and a relative position in which the real-world view through the optical waveguide in the region of the at least one output optical element is not occluded.

The projector housing serves two functions, namely housing most, if not all, of the components of the projector used to generate the image input to the input optical element, and acting as a screen or shutter to enable the display device to operate in two different modes: a virtual reality mode when the projector housing occludes the real-world view through the optical waveguide in the region of the at least one output optical element, and an augmented reality mode when the projector housing does not occlude the real-world view through the optical waveguide in the region of the at least one output optical element.

The use of the projector housing avoids the need for additional components to provide for the occlusion of the real-world view and a simple relative movement between the optical waveguide and the projector housing provides a simple shutter mechanism.

The display device may be arranged to have one or two output optical elements to provide a monocular or binocular display device.

The projector may be contained within and comprise the projector housing and be rotatably attached to the optical waveguide and be relatively rotatable with respect to the optical waveguide between the relative position in which a real-world view through the optical waveguide in the region of the at least one output optical element is occluded and the relative position in which the real-world view through the optical waveguide in the region of the at least one output optical element is not occluded The relative position in which the real-world view through the optical waveguide in the region of the at least one output optical element is not occluded may be at 90°, 180° or 270° to the relative position in which a real-world view through the waveguide in the region of the at least one output optical element is occluded.

The input optical element may be configured to receive the image from the projector independent of the orientation of the projector relative to the optical waveguide.

The optical waveguide may extend in a plane, and the projector housing may lie substantially parallel to the plane of the optical waveguide. The projector housing may be relatively rotatable with the optical waveguide so that the projector housing lies to remain substantially parallel to the plane of the optical waveguide.

The projector housing may contain the projector so that the image output from the projector is fixed relative to the projector housing. The projector may include an image processor to correct the orientation of the image generated by the projector and received by the input optical element of the optical waveguide dependent on the relative orientation of the projector housing and the optical waveguide.

In an alternative arrangement, a projector output element of the projector is fixed to the optical waveguide separate to the projector housing, the projector housing rotates relatively to the projector output element, and at least one optical or electric coupling is provided between components in the projector housing and the projector output element.

The optical waveguide and the projector housing may be configured to enable the projector housing to relatively move with respect to the optical waveguide by translation so that they can relatively slide across one another. In such an arrangement, the projector output element of the projector may be fixed to the optical waveguide separate to the projector housing. The projector housing can then translate relatively to the projector output element, and at least one optical or electric coupling can be provided between components in the projector housing and the projector output element.

The optical waveguide may extend in a plane, and the optical waveguide and the projector housing may be configured to enable the projector housing to relatively rotate with respect to the optical waveguide around an axis substantially parallel to the plane. In such an arrangement, the projector output element of the projector may be fixed to the optical waveguide separate to the projector housing. The projector housing can then rotate relatively to the projector output element, and at least one optical or electric coupling can be provided between components in the projector housing and the projector output element.

When a projector includes a projector output element separate to the projector housing, it may include an optical image generator element, and the coupling provided between components in the projector housing and the projector output element may comprise at least one electrical coupling.

When a projector includes a projector output element separate to the projector housing, it may include at least one optical component, and the coupling provided between components in the projector housing and the projector output element may comprise at least one optical coupling.

The projector housing may be coupled to the optical waveguide to rotate about the input optical element.

At least one of the input optical element and the output optical element may be a surface relief diffractive element.

The at least one output optical element may be adapted to output the image in an expanded form compared with the form of the image input to the input optical element from the projector.

The optical waveguide may include a least one intermediate optical element to receive the image from the input optical element and to output the image in an expanded form to the output optical element, the output image is in an expanded form compared with the form of the image input to the input optical element from the projector.

The projector may be arranged to input the image to the input optical element on a first side of the optical waveguide, and the output optical element may be arranged to output the image on a second side opposed the first side.

The display device may act in a virtual reality display mode when the projector housing is relatively positioned to occlude a real-world view through the optical waveguide in the region of the at least one output optical element, and in an augmented reality display mode when the projector housing is relatively positioned to not occlude a real-world view through the optical waveguide in the region of the at least one output optical element.

The display device can comprise a head-mounted display device incorporated into for example, a helmet or a frame, such as glasses of googles, to be worn by a user so that the output optical element is arranged to lie a short distance from the eye of the viewer, so that the viewer can view the real world through the output optical element of the optical waveguide, as well as overlaid displayed image elements, in an augmented reality mode when not occluded by the projector housing. The optical waveguide allows light from the real world to pass through the output optical element when not occluded.

The use of the projector housing as an occlusion or shutter to block the light reaching the output optical element in the display device performs additional occlusion functions. The occlusion of the ambient light from the real-world view avoids distracting background image information when not required when the display device is operating in a virtual reality mode. The occlusion to avoid the ambient light also increases contrast for the viewing of the displayed image from the output optical element. Further, since the image is output from the output optical element in both directions (sides) from the optical waveguide, the occlusion of the face of the waveguide away from the intended viewing direction of the image by the viewer, blocks the output of the image to reduce the likelihood of any third party viewing the image. This improves security and confidentiality for sensitive information in the viewed image.

The display device in various arrangements can thus act as a hybrid virtual reality and augmented reality display device.

Specific embodiments will now be described with reference to the figures.

In general, a display device in accordance with an embodiment requires an optical waveguide with an input optical arrangement to couple the input image from a projector into the optical waveguide and at least one output optical arrangement to output the image to at least one eye of a viewer or user in an expanded form. Any optical configuration that provides an input coupling for a projector and an expanded output can be used. The optics required for the projector output will depend on the orientation of the generated image, i.e. the orientation of the light emitting elements of the projector, and the optical components required can include one or more lenses, one or more prisms and/or one or more mirrors i.e. the requisite refractive and reflective optical elements to take the image generated by light emitting elements to the surface of the input optical element of the optical waveguide.

In one arrangement the input optical element of the optical waveguide may be a surface relief diffractive element and the at least one output optical element may also be a surface relief diffractive element, as for example described in GB2529003, the disclosure of which is hereby incorporated in its entirety.

Different forms of waveguides for use with the display device, will now be considered before describing various display device configurations.

FIGS. 1A and 1B and FIGS. 2A and 2B illustrate two different waveguide configurations will now be described.

Figure 1B:
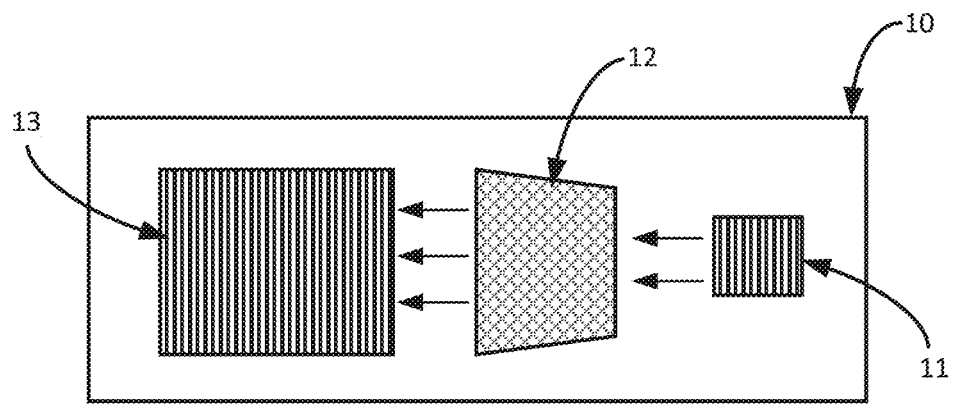

FIG. 1A is a perspective view and FIG. 1B is a front view of an optical waveguide 10. Such an optical waveguide 10 is shown in the prior art in WO2008/081070, the disclosure of which is hereby incorporated in its entirety.

The optical waveguide 10 has an input grating 11 to couple an input image from a projector into the optical waveguide 10 and an output grating 13 to output the image to an eye of a viewer 15 in an expanded form compared with the form of the image input to the input grating 11 from a projector. A crossed grating 12 is provided in the optical path between the input and output gratings 11 and 13. The crossed grating 12 includes two overlapping gratings with grooves at 90° to one another. Light travels by total internal reflection from the input grating 11 towards the crossed grating 12. When light from the input grating 11 encounters the crossed grating 12 it is simultaneously diffracted in opposite directions, which are mutually orthogonal to the input light beam from the input grating 11 but are within the plane of the optical waveguide 10. The light is then diffracted again in the crossed grating 12 so that it can extend towards the output grating 13. In this way, the crossed grating 12 can provide expansion of the input light in two opposite directions.

Light is output by the crossed grating 12 within the plane of the optical waveguide and travels towards the output grating 13. When the input light encounters the output grating 13 it is either transmitted or diffracted. The transmitted portion of the beam extends within the output grating 13, and the diffracted portion of the beam is coupled out of the optical waveguide 10 towards the viewer 15.

Any transmitted portions of the beam can then be diffracted out of the waveguide 10 by later grooves of the output grating 13. Thus, a first dimension of expansion is provided by the crossed grating 12 and a second dimension of expansion is provided by the output grating 13. In order for this to be effective, the grating periods are selected specifically to prevent any out-coupling of light by the crossed grating 12. Thus, the only out-coupling of light from the optical waveguide is by the output grating 13.

The optical waveguide 10 comprises an optical material extending in a plane from the input grating 11 to the output grating 13. It has a thickness to provide for total internal reflection to guide the light from the input grating 11 to the output grating 13.

In the arrangement illustrated in FIGS. 1A and 1B, the image input to the input grating 11 can be input on either side and likewise the image output from the output grating 13 is output on both sides. In the illustration the image is input to the input grating 11 on one side of the optical waveguide 10 and the image is shown output from the output grating on the other side of the optical waveguide 10. This configuration is illustrated for convenience of design as a head-mounted display since the output image is output to the eye of a wearer and there is little room on that side for the projector in a conventional arrangement. Further, in the display devices in accordance with embodiments, the provision of the projector on the other side of the optical waveguide 10 enables the use of the projector housing to occlude the side of the optical waveguide 10 away from the image output.

The arrangement illustrated in FIGS. 1A and 1B is an optical waveguide configuration that receives an input image from a projector at the input grating 11 and generates an expanded image output from the output grating 13. The output image is expanded compared with the form of the image input to the input grating 11 from the projector The optical configuration of the waveguide hence can meet the optical requirements for the display device. However, the need for the crossed grating 12 as an intermediate optical element to expand the image is not the most optically efficient arrangement.

Figure 2A:
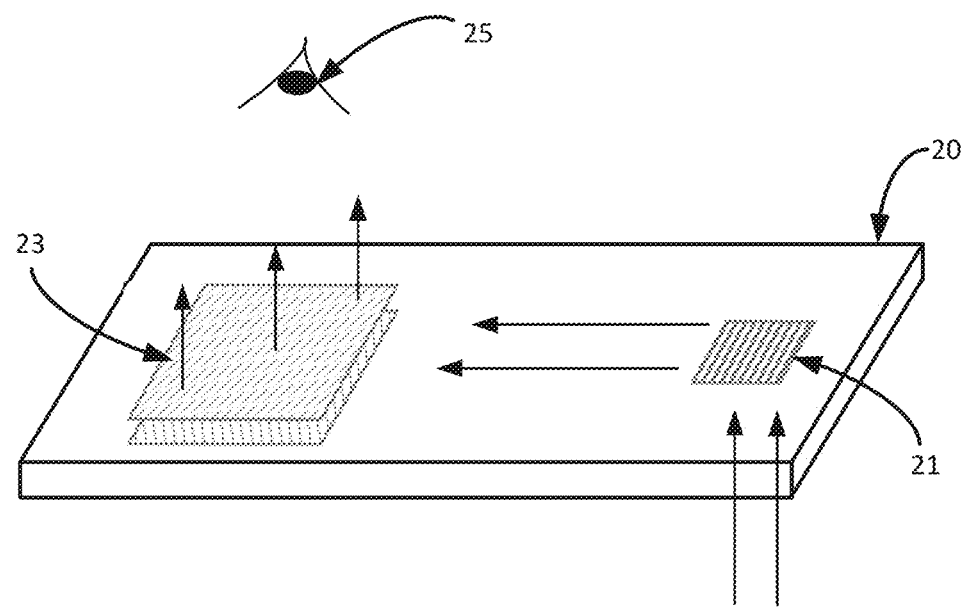
FIGS. 2A and 2B illustrate an alternative optical waveguide configuration for use in an example display device.
Figure 2B:
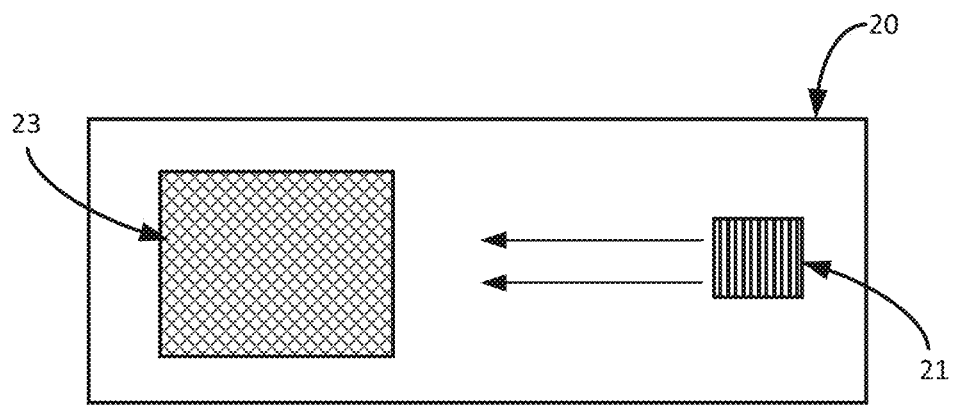

FIGS. 2A and 2B illustrate an alternative optical waveguide configuration, in which an intermediate optical element is not required.

FIG. 2A is a perspective view and FIG. 2B is a front view of an optical waveguide 20. Such an optical waveguide 20 in shown in the prior art in GB2529003, the disclosure of which is hereby incorporated in its entirety.

The optical waveguide 20 has an input grating 21 to couple an input image from a projector into the optical waveguide 20 and an output grating 23 to output the image to an eye of a viewer 25 in an expanded form compared with the form of the image input to the input grating 21 from the projector. Light output by the input grating 21 travels by total internal reflection towards the output grating 23.

The output grating 23 includes two overlapping gratings with grooves at angles to one another. When light from the input grating 21 encounters the output grating 23 it is simultaneously diffracted in opposite directions, which are at an angle to the input light beam from the input grating 21 within the plane of the optical waveguide 20. It is also diffracted out of the waveguide 20. In this way, the output grating 23 can provide expansion of the input light in two opposite directions as well as outputting the light from the optical waveguide 20 towards the viewer 25.

Although the output grating 23 is shown as two separated angled gratings in FIGS. 2|A and 2B, an any form of grating structure or optical element can be used that provides for both image expansion and image output.

The optical waveguide 20 comprises an optical material extending in a plane from the input grating 21 to the output grating 23. It has a thickness to provide for total internal reflection to guide the light from the input grating 21 to the output grating 23.

Figure 3A:
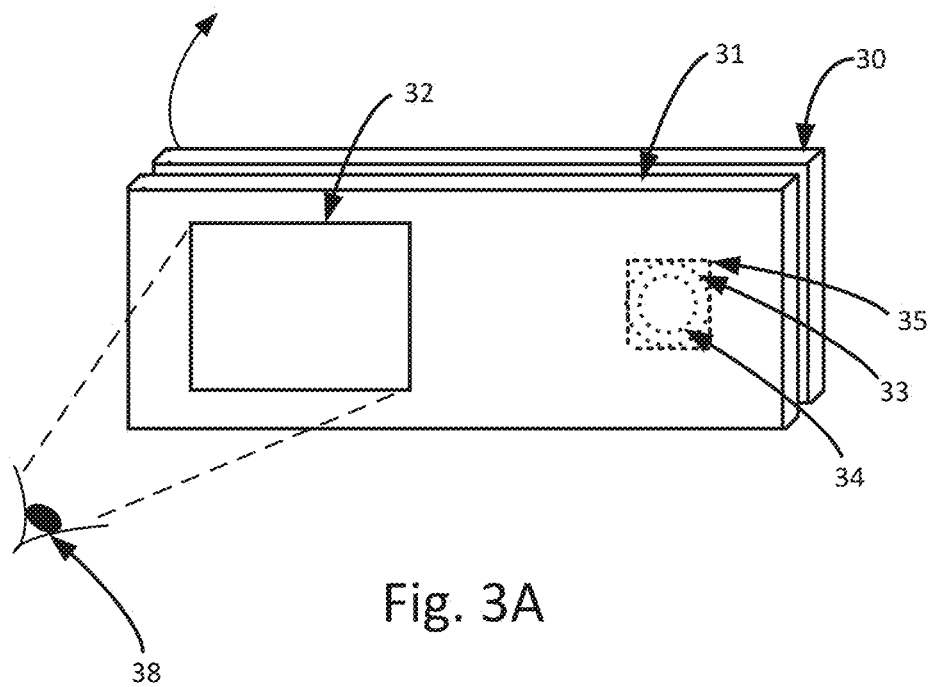
FIGS. 3A and 3B illustrate a display device of a first display device arrangement in a virtual reality display mode.
Figure 3B:
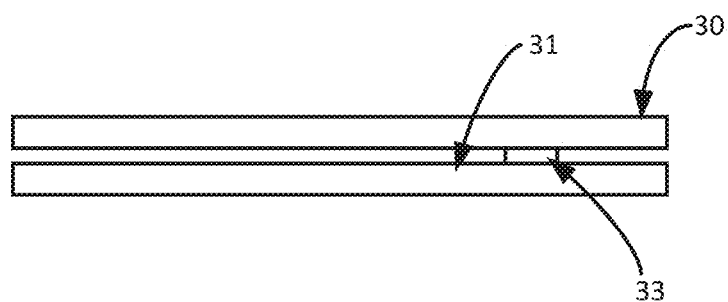

A first display device arrangement will now be described with reference to FIGS. 3A, 3B, 4A, 4A 5A and 5B. FIG. 3A is a perspective view and FIG. 3B is a plan view of the display device in a virtual reality display mode, in which the view of the real-world by the viewer 38 is occluded.

An optical waveguide 31 comprises a waveguide as described with reference to FIGS. 1A and 1B or FIGS. 2A and 2B and as a minimum it has an input optical element 35 and an output optical element 32. If the arrangement of FIGS. 1A and 1B is used, an intermediate optical element can be used (not shown). The input optical element 35 and the output optical element 32 are spaced along the plane of the optical waveguide 31. The input optical element 35 is arranged to receive an input image from a projector housing 30. The optical output element 32 is arranged to provide an output expanded image to the eye of a viewer 38, wherein the output image is expanded compared with the form of the image input to the input optical element from the projector.

The projector in this arrangement is arranged in a projector housing 30 that lies in a substantially parallel to the plane of the optical waveguide 31 and lying adjacent to a side or face of the optical waveguide 30 away from the viewer 38 and on the opposite side from the side of the optical waveguide that the optical output element 32 outputs the expanded image. The projector housing 30 contains the components of the projector, including the electronic components and the optical components as will be described in more detail hereinafter.

The projector housing 30 is coupled to the optical waveguide 31 between the opposed faces in the region of the input optical element 35 by a rotatable coupling 33 that allows relative rotation of the projector housing 30 and the optical waveguide 31 about an axis substantially perpendicular to the plane of the optical waveguide 31 and centered on the optical input element 35. The rotatable coupling 33 permits the projector housing 30 to be rotated relatively to the optical waveguide 31 through a range of angles.

In this arrangement light is projected through the internal hollow 34 of the coupling 33, so that the projector within the housing 30 inputs an image onto the face of the input optical element 35 of the optical waveguide 31.

In this configuration, the projector housing 30 lies across the rear face of the optical waveguide 31 in the region of the output optical element 32 to occlude a real-word view of the viewer 38 by occluding and preventing light passing through the optical waveguide 31 in the region of the output optical element 32 for mixing with the generated image from the projector.

Hence, in this arrangement, the projector housing 30 occludes the face of the optical waveguide 31 in the region of the output optical element 32 and hence a viewer 38 does not see a real-world view combined with the image output from the output optical element 32. The display device is therefore operating in a virtual reality display mode.

In some embodiments a prism (not shown) may be provided at the interface between the projector and input optical element 35. The prism may be fixedly attached to either the projector or on a rotatable element attached to the waveguide, such that light from the projector is always directed at the same face of the prism regardless of the rotational position of the projector housing 30 relative to the optical waveguide 31. A prism enables the projector light output element to lie orthogonal to the face of the input optical element 35. This allows for a design where the projector can extend across the plane of the projector housing 30. In an alternative configuration, the output of the light emitting element of the projector is substantially parallel to the face of the input optical element 35.

Figure 4A:
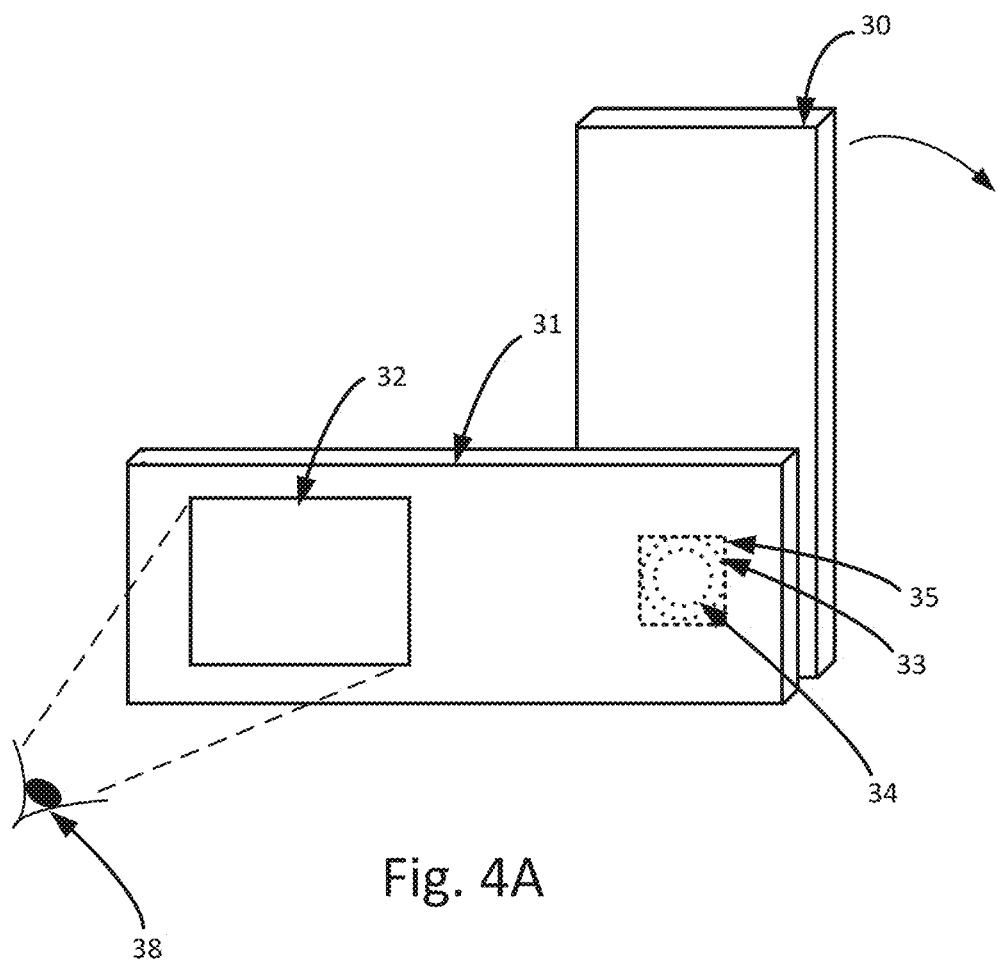
FIGS. 4A and 4B illustrate a display device of a first display device arrangement in a first augmented reality display mode.
Figure 4B:
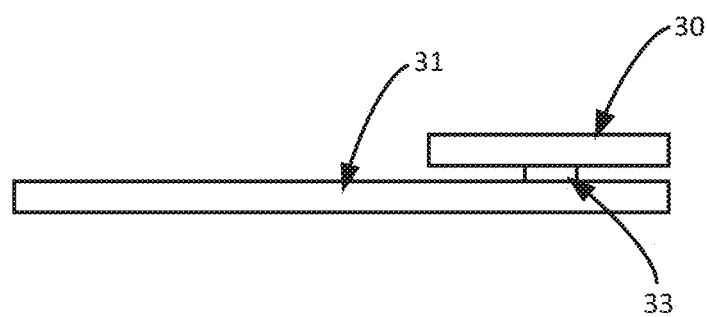

FIGS. 4A and 4B illustrate the configuration of FIGS. 3A and 3B in an arrangement after the relative rotation of the projector housing 30 and the optical waveguide 31 through and angle of 90° or 270°.

As can be seen in FIGS. 4A and 4B, the projector housing 30 now lies orthogonal to the optical waveguide 31 but still substantially parallel to the optical waveguide 31 and the projector housing 30 no longer lies on a rear face of the optical waveguide 31 in the region of the output optical element 32. The bulk of the projector housing 30 now lies away from the optical waveguide 31 in a region above the optical waveguide 31.

Hence, in this arrangement, the projector housing 30 does not occlude the face of the optical waveguide 31 in the region of the output optical element 32 and hence a viewer 38 sees a real-world view combined with the image output from the output optical element 32. The display device is therefore operating in an augmented reality display mode.

Figure 5A:
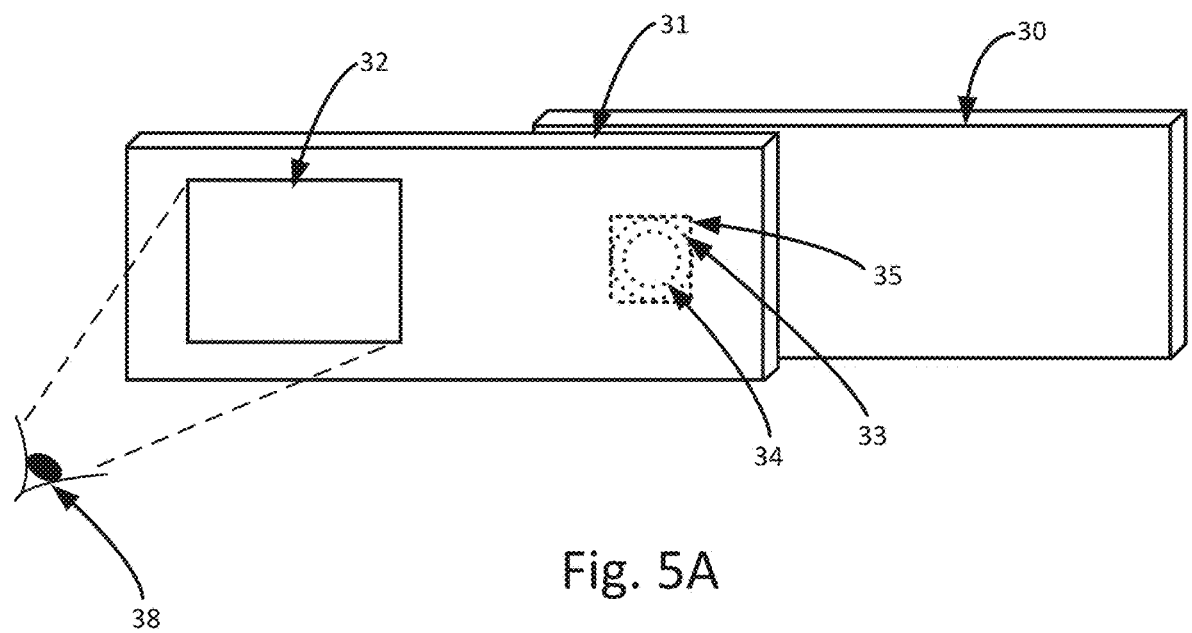
FIGS. 5A and 5B illustrate a display device of a first display device arrangement in a second augmented reality display mode.
Figure 5B:
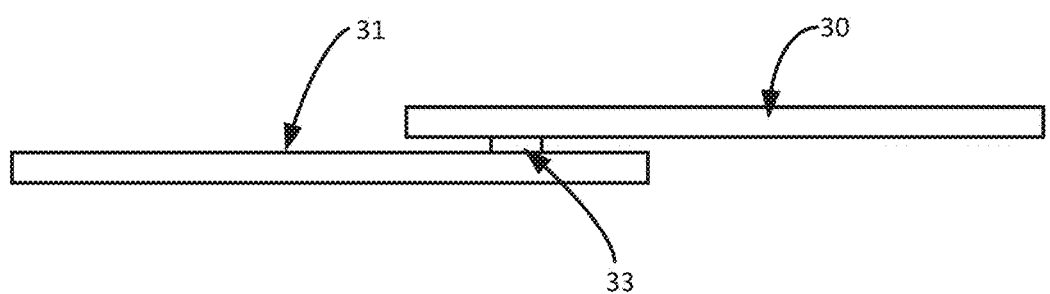

FIGS. 5A and 5B illustrate the configuration of FIGS. 3A and 3B in an arrangement after the relative rotation of the projector housing 30 and the optical waveguide 31 through and angle of 180°.

As can be seen in FIGS. 5A and 5B, the projector housing 30 now lies extending away from the output optical element 32 of optical waveguide 31, but still substantially parallel to the optical waveguide 31. Hence the projector housing 30 no longer lies on a rear face of the optical waveguide 31 in the region of the output optical element 32. The bulk of the projector housing 30 now lies away from the optical waveguide 31 in a region to the side of the optical waveguide 31.

Hence, in this arrangement, the projector housing 30 does not occlude the face of the optical waveguide 31 in the region of the output optical element 32 and hence a viewer 38 sees a real-world view combined with the image output from the output optical element 32. The display device is therefore operating in an augmented reality display mode.

In the display device configuration illustrated in FIGS. 3A, 3B, 4A, 4B, 5A and 5B the optical waveguide 31 can be attached to a housing, which may be an armature (not shown) that can attach the optical waveguide 31 to a head worn support, such as for example a helmet or a frame, such as glasses or goggles.

In the display device configuration illustrated in FIGS. 3A, 3B, 4A, 4B, 5A and 5B the projector housing 30 can contain all of the components of the projector, so that the coupling 33 simply comprises a mechanical coupling between the projector housing 30 and the optical waveguide 31. However, in such a simple arrangement, the light emitting arrangement of the projector that generates the image for viewing by the viewer 38 will rotate relatively to the optical waveguide 31.

FIGS. 6A, 6B and 6C illustrate orientations of the input image and the output image according to different arrangements of the display device configuration described with reference to FIGS. 3A, 3B, 4A, 4B, 5A and 5B.

FIG. 6A illustrates the rotational configuration of the input image 63*a* to the input optical element 31 of the waveguide 30, the theoretical orientation of the image 64*a* communicated from the input optical element 31 to the output optical element 32, and the orientation of the output image 65a for the operation of the arrangement of FIGS. 3A and 3B. It can be seen that the orientation of the output image 65a is correct for viewing by the viewer.

FIG. 6B illustrates the rotational configuration of the input image 63b to the input optical element 31 of the waveguide 30, the theoretical orientation of the image 64b communicated from the input optical element 31 to the output optical element 32, and the orientation of the output image 65b for the operation of the arrangement of FIGS. 4A and 4B. It can be seen that the orientation of the output image 65b is not correct for viewing by the viewer. It is relatively rotated by the degree of rotation of the projector housing 30 and the optical waveguide 31.

FIG. 6C illustrates the rotational configuration of the input image 63c to the input optical element 31 of the waveguide 30, the theoretical orientation of the image 64c communicated from the input optical element 31 to the output optical element 32, and the orientation of the output image 65c for the operation of the arrangement of FIGS. 4A and 4B. It can be seen that the orientation of the output image 65c is not correct for viewing by the viewer. It is relatively rotated by the degree of rotation of the projector housing 30 and the optical waveguide 31.

To overcome the problem of incorrectly orientated output images due to the relative rotation of the projector housing 30 containing all the components of the projector, image processing can be performed on the image to be generated by the image generator as the input image to the input optical element, to correct for the relative rotation of the projector housing 30 and the optical waveguide 31 by relatively rotating the image generated. Hence, for example for the arrangement of FIGS. 4A and 4B the image processing in the projector will generate an image that is rotated by 90° or 270°, and for the arrangement of FIGS. 5A and 5B the image processing in the projector will generate an image that is rotated by 180°.

To perform the required image processing, the display device can be provided with an arrangement to perform this automatically. This can comprise a sensor (not shown) to detect the relative rotation of the projector housing 30 to the optical waveguide 31 when the rotation is performed manually. The output of the sensor can be received within the projector and used to control the image processing as required. This arrangement is based on a manual switching between the virtual reality display mode and the augmented reality display mode. In an alternative arrangement, the switching arrangement can be performed electronically. A motor can be provided to relatively rotate the projector housing 30 and the optical waveguide 31 to switch between the virtual reality display mode and the augmented reality display mode. The control to the motor to perform the rotation can also be used to control the image processing as required.

The configuration of FIGS. 3A, 3B, 4A, 4B, 5A and 5B is based on all the projector components being contained in the projector housing 30 and this rotating relative to the optical waveguide 31 and this then only requires a simple mechanical rotational coupling 33. However, compensating optical image processing is required. In an alternative configuration, within the rotational coupling 33 an optical component of the projector can be arranged that is fixed relative to the optical waveguide 31. This fixed optical component can comprise any components necessary to ensure that the input image remains in the correct orientation with respect to the input optical element 35 of optical waveguide 31 and avoids the need for image processing compensation. The optical components may comprise the image generating element of the projector and the rotational coupling 33 will therefore include electrical connections from other electronic components of the projector in the projector housing 31 that rotates relative to the optical waveguide 31.

Figure 7A:
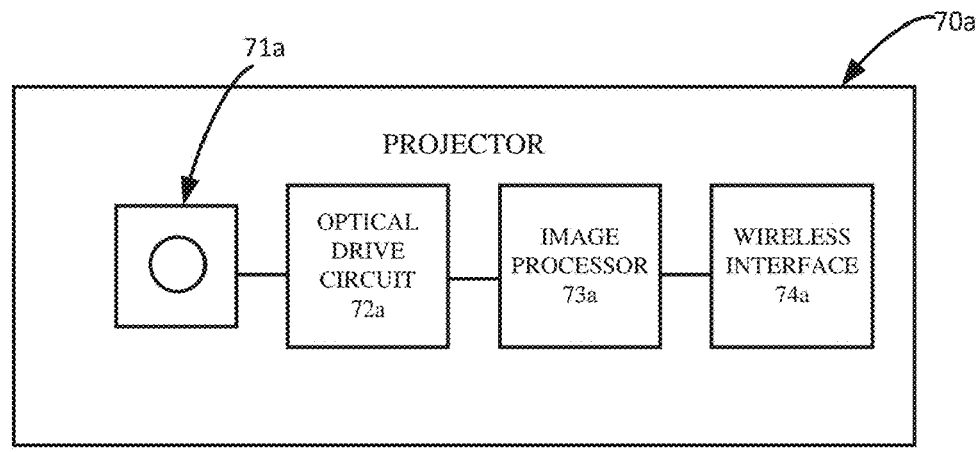
FIGS. 7A, 7B and 7C are schematic diagrams of the projector components in various display device configurations.
Figure 7B:
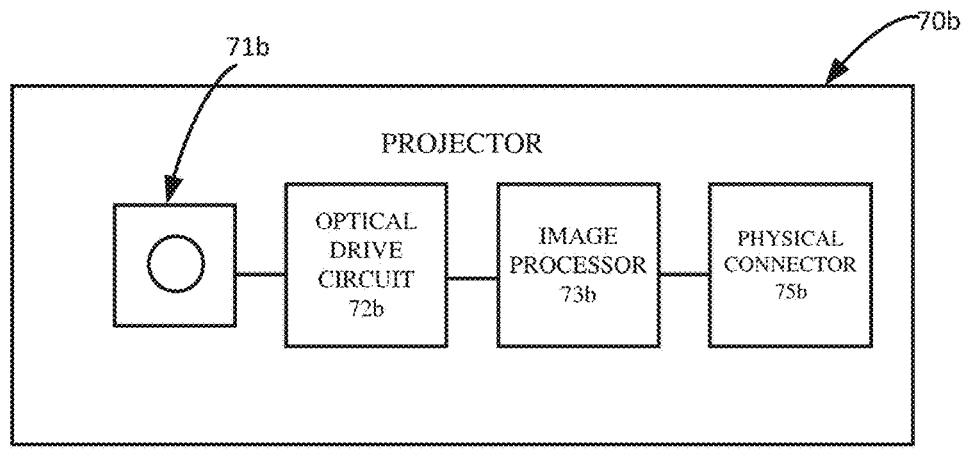
Figure 7C:
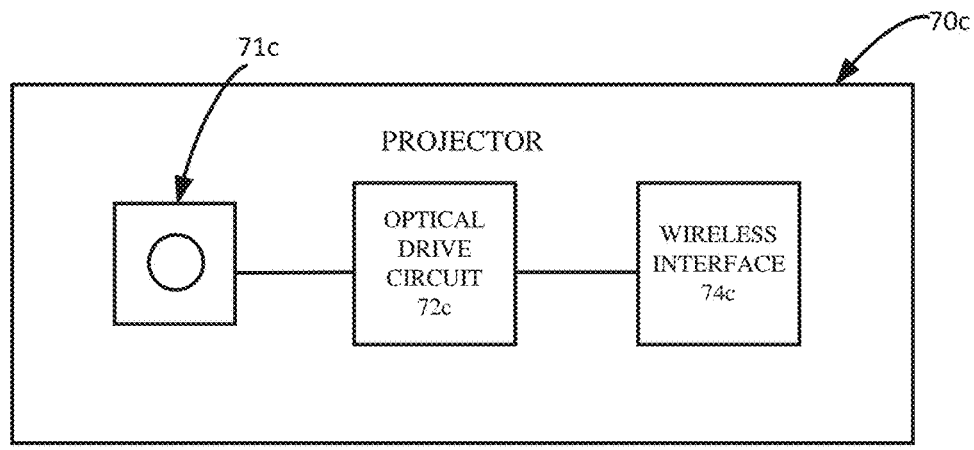

FIGS. 7A, 7B and 7C are schematic diagrams of the projector components in various display device configurations.

FIG. 7A illustrates a projector configuration in which the projector 70a comprises optical components 71a, an optical drive circuit 72a, an image processor 73a and a wireless interface 74a. In this configuration the optical components 71a can comprise the light emitting elements and other optical components such as refractive and/or reflective optical elements. The optical drive circuit 72a generates the required drive signals to drive the light emitting elements under the control of the image processor 73a. The wireless interface 74a can comprise any form of conventional wireless interface, such as WiFi, Zigbee®, or Bluetooth® and enables connection of the display device with a remote device such as a computer, mobile device/telephone, or tablet for the transmission of information for display and for receiving information from the display device.

FIG. 7B illustrates an alternative projector configuration in which the projector 70b comprises optical components 71b, an optical drive circuit 72b, an image processor 73b and a physical connector 75b. In this configuration the optical components 71b can comprise the light emitting elements and other optical components such as refractive and/or reflective optical elements. The optical drive circuit 72b generates the required drive signals to drive the light emitting elements under the control of the image processor 73b. The physical connector 75b enables connection of the display device with a remote device such as a computer, mobile device/telephone, or tablet for the transmission of information for display and for receiving information from the display device.

FIG. 7C illustrates another projector configuration in which the projector 70c comprises optical components 71c, an optical drive circuit 72c, and a wireless interface 74a. In this configuration the optical components 71c can comprise the light emitting elements and other optical components such as refractive and/or reflective optical elements. The optical drive circuit 72c generates the required drive signals to drive the light emitting elements under the control of information received remotely. The wireless interface 74c can comprise any form of conventional wireless interface, such as WiFi, Zigbee®, or Bluetooth® and enables connection of the display device with a remote device such as a computer, mobile device/telephone, or tablet for the transmission of information for display and for receiving information from the display device.

It can be seen from the described configurations for the display device that it can either include on board image processing for the preparation of image data for image generation or it can be required to receive this image data from a remote device over a wireless or physical link.

An alternative display device configuration will now be described with reference to FIGS. 8A, 8B, 8C, 9A, 9B, 10A, 10B and 10C. In this configuration part of the projector, a projector output element, is separate to the projector housing and fixed to the optical waveguide at the location of the input optical element to act as a pivot point for the projector housing to rotate about an axis A substantially parallel to the plane of the optical waveguide.

Figure 8A:
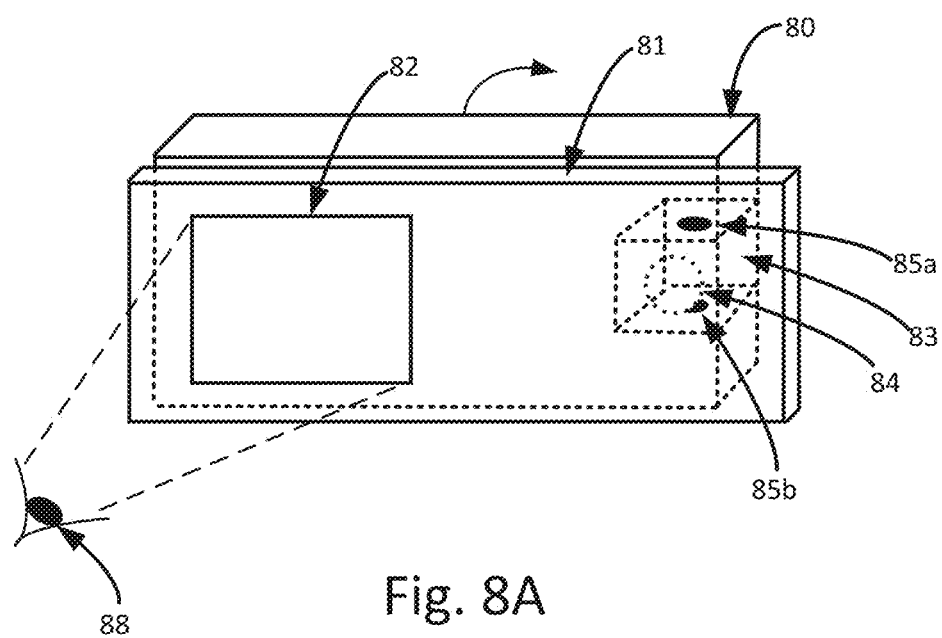
FIGS. 8A, 8B and 8C illustrate a display device of a second display device arrangement in a virtual reality display mode.
Figure 8B:
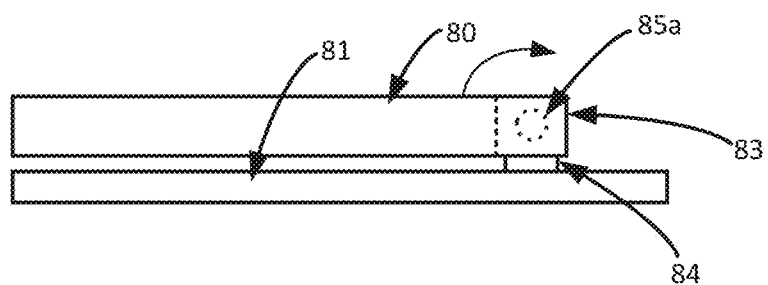
Figure 8C:
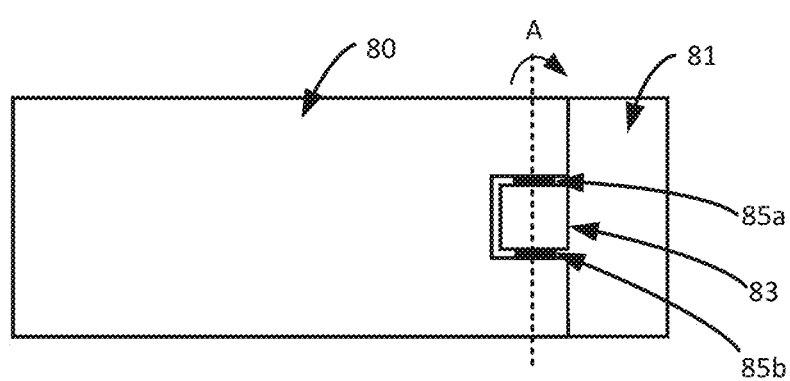

FIG. 8A is a perspective view, FIG. 8B is a plan view, and FIG. 8C is a rear view of a display device in a virtual reality display mode, in which the view of the real-world by the viewer 88 is occluded.

An optical waveguide 81 comprises a waveguide as described with reference to FIGS. 1A and 1B or FIGS. 2A and 2B and as a minimum it has an input optical element and an output optical element 82. If the arrangement of FIGS. 1A and 1B is used, an intermediate optical element can be used (not shown). The input optical element and the output optical element 82 are spaced along the plane of the optical waveguide 81. The input optical element is arranged to receive an input image. The optical output element 82 is arranged to provide an output expanded image to the eye of a viewer 88, where the output image is expanded compared with the form of the image input to the input optical element from the projector.

In this arrangement, a projector housing 80 lies substantially parallel to the plane of the optical waveguide 81 and lies adjacent to a side or face of the optical waveguide 81 away from the viewer 88 and on the opposite side from the side of the optical waveguide 81 that the optical output element 82 outputs the expanded image that is expanded compared with the form of the image input to the input optical element from the projector. The projector housing 80 contains some of the components of the projector, including the electronic components and possibly some of the optical components.

A projector output element 83 is fixed to a rear face of the optical waveguide 81 at a position over the input optical element of the optical waveguide 81. The projector output element 83 is shown as a cube shape sitting within a cut out portion of the projector housing 80. The projector output element 83 comprises optical elements required to output the image as the input image to the input optical element of the optical waveguide 81 in a fixed manner. The input optical element is hence within the footprint on the optical waveguide 81 of the shown cube of the projector output element 83. The input image is represented by the element 84.

The projector housing 80 is coupled to the projector output element 83 by a hinge coupling 85a and 85b that allows relative rotation of the projector housing 80 and the optical waveguide 31 about an axis A substantially parallel to the plane of the optical waveguide 81. The hinged coupling 85a and 85b permits the projector housing 80 to be rotated relatively to the optical waveguide 81 through a range of angles. The hinged coupling 85a and 85b also provides a route for electrical and/or optical couplings between projector components in the projector housing 80 and the optical components in the projector output element 83 by passing the couplings through a hollow centre of the hinged coupling 85a and 85b.

In this configuration, the projector housing 80 lies across the rear face of the optical waveguide 81 in the region of the output optical element 82 to occlude a real-word view of the viewer 88 by occluding and preventing light passing through the optical waveguide 81 in the region of the output optical element 82 for mixing with the generated image from the projector.

Hence, in this arrangement, the projector housing 80 occludes the face of the optical waveguide 81 in the region of the output optical element 82 and hence a viewer 88 does not see a real-world view combined with the image output from the output optical element 82. The display device is therefore operating in a virtual reality display mode.

Figure 9A:
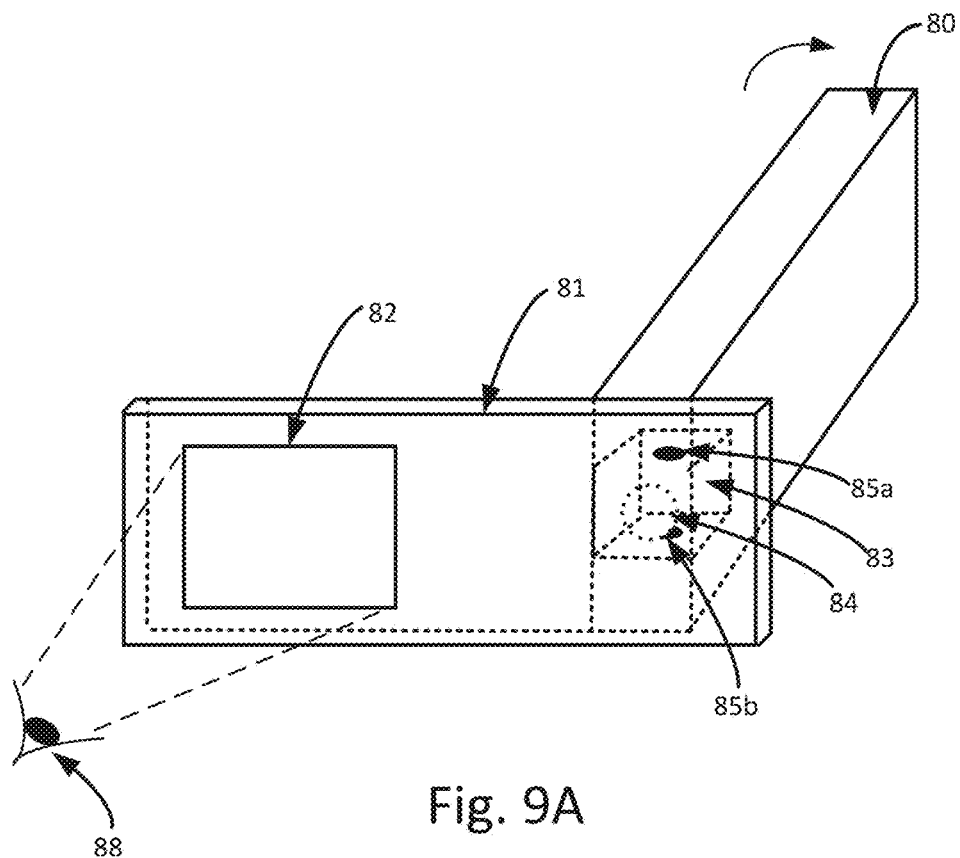
FIGS. 9A and 9B illustrate a display device of a second display device arrangement in a first augmented reality display mode.
Figure 9B:
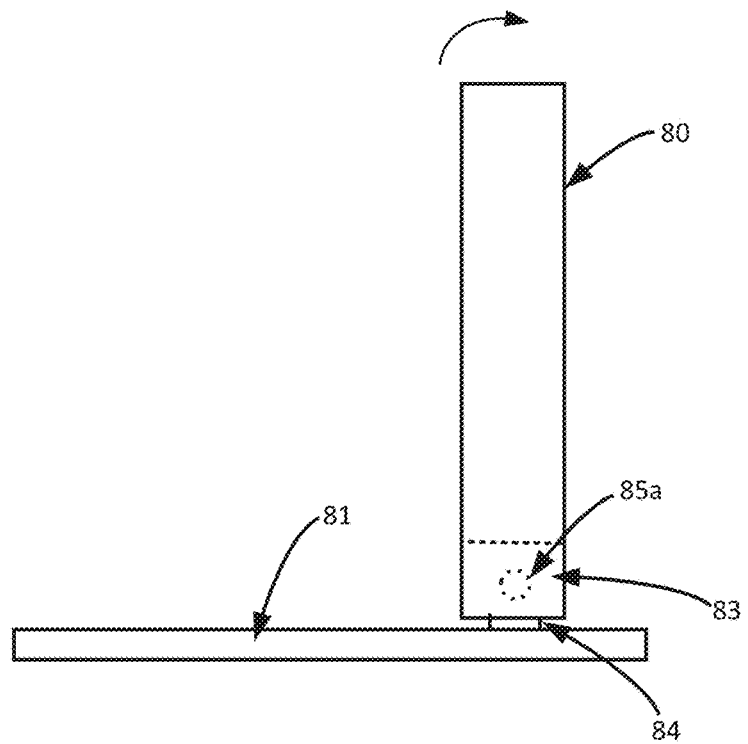

FIGS. 9A and 9B illustrate the configuration of FIGS. 8A, 8B and 8C in an arrangement after the relative movement of the projector housing 80 and the optical waveguide 81 through and angle of 90°.

As can be seen in FIGS. 9A and 9B, the projector housing 80 now lies orthogonal to the plane of the optical waveguide 81 and the projector housing 80 no longer lies on a rear face of the optical waveguide 81 in the region of the output optical element 82. The bulk of the projector housing 80 now extends orthogonally away from the optical waveguide 81.

Hence, in this arrangement, the projector housing 80 does not occlude the face of the optical waveguide 81 in the region of the output optical element 82 and hence a viewer 88 sees a real-world view combined with the image output from the output optical element 82. The display device is therefore operating in an augmented reality display mode.

Figure 10A:
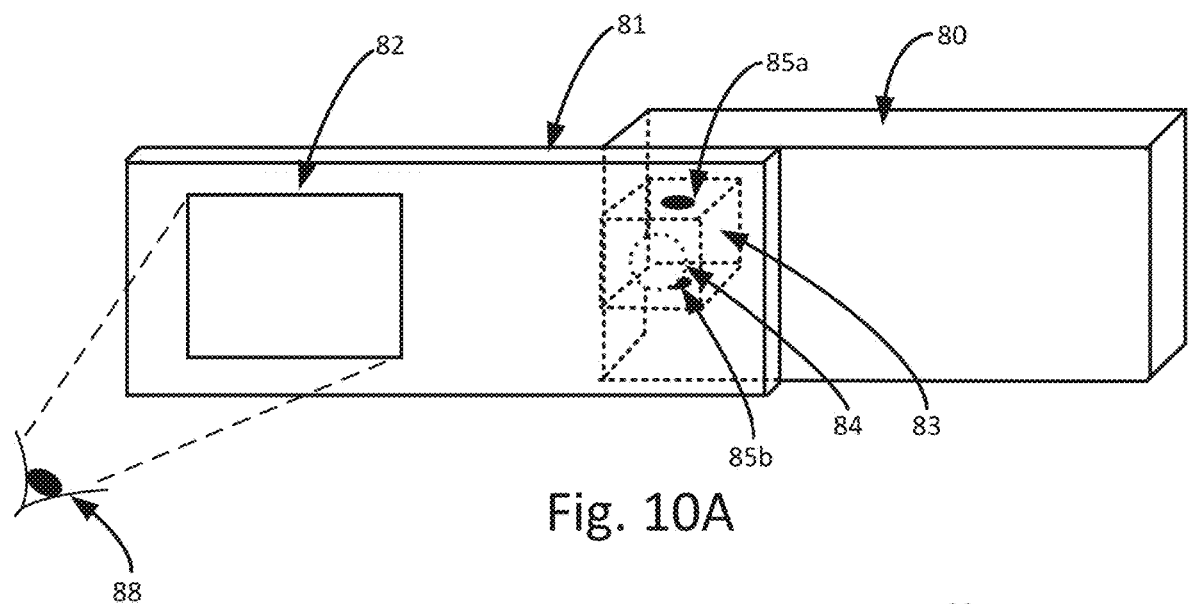
FIGS. 10A, 10B and 10C illustrate a display device of a second display device arrangement in a second augmented reality display mode.
Figure 10B:
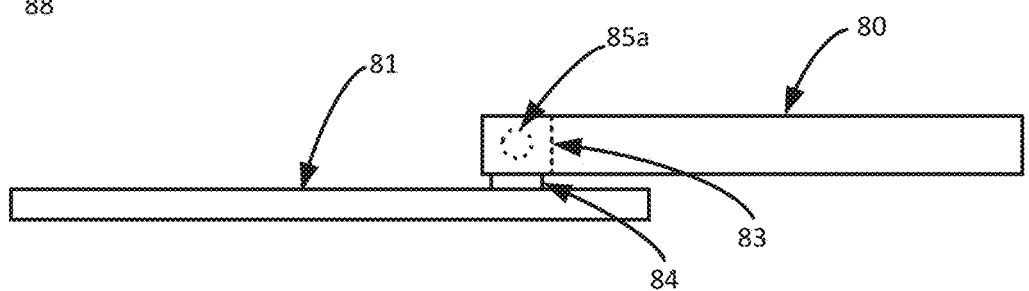
Figure 10C:
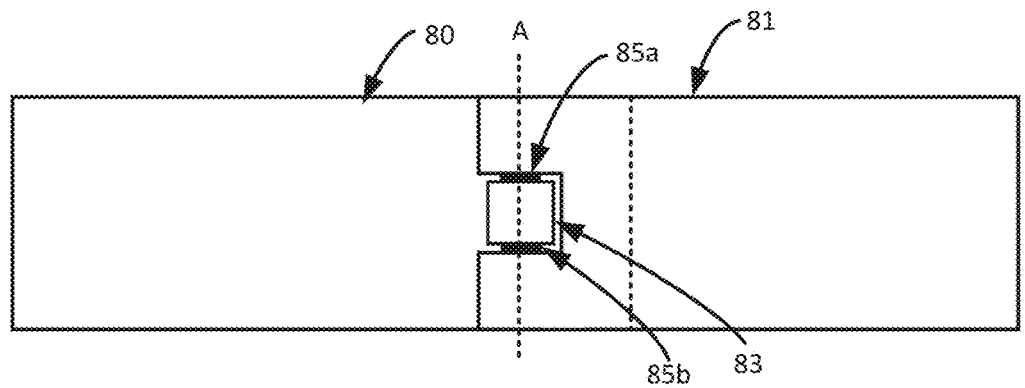

FIGS. 10A, 10B and 10C illustrate the configuration of FIGS. 8A, 8B and 8C in an arrangement after the relative movement of the projector housing 80 and the optical waveguide 81 through and angle of 180°.

As can be seen in FIGS. 10A, 10B and 10C, the projector housing 80 now lies extending away from the output optical element 82 of optical waveguide 81, substantially parallel to the optical waveguide 81. Hence the projector housing 80 no longer lies on a rear face of the optical waveguide 81 in the region of the output optical element 82. The bulk of the projector housing 80 now lies away from the optical waveguide 81 in a region to the side of the optical waveguide 81.

Hence, in this arrangement, the projector housing 80 does not occlude the face of the optical waveguide 81 in the region of the output optical element 82 and hence a viewer 88 sees a real-world view combined with the image output from the output optical element 82. The display device is therefore operating in an augmented reality display mode.

In the display device configuration illustrated in FIGS. 8A, 8B, 8C, 9A, 9B, 10A, 10B and 10C the optical waveguide 81 can be attached to a housing, which may be an armature (not shown) that can attach the optical waveguide 81 to a head worn support, such as for example a helmet or a frame, such as glasses or goggles.

In a modification of the arrangement of FIGS. 8A, 8B, 8C, 9A, 9B, 10A, 10B and 10C, the projector can be mounted in the projector housing 80 and the projector output element 83 can comprise a prism or mirror that rotates from a first position in the arrangement of FIGS. 8A, 8B and 8C to a second position in the arrangement of FIGS. 10A, 10B and 10C. The prism or mirror directs the image output from the projector in a plane substantially parallel to the plane of the optical waveguide 81 through a 90° angle onto the input optical element of the optical waveguide 81. In this configuration, there is an optical coupling with between the projector housing 80 to couple the projector and the prism or mirror. The prism or mirror can be rotated using a mechanical coupling with the hinged coupling 85a and 85b, so as to rotate as a result of the rotation about the hinged coupling 85a and 85b. Alternatively, a motor can be provided to rotate the prism or mirror, which is controlled by an electrical connection from drive electronics in the projector housing 80.

In a further alternative configuration of the display device, instead of relatively rotating the projector housing and the optical waveguide, they can be translationally moved by sliding the components relative to each other. A projector output element can be fixed to a rear face of the optical waveguide at a position over the input optical element of the optical waveguide. The projector output element can be a cube shape sitting within a cut out portion of the projector housing. The projector output element comprises optical elements required to output the image as the input image to the input optical element of the optical waveguide in a fixed manner. The projector output element can comprise a translational coupling with the projector housing so that the projector housing can slide relative to the fixed projector output element so that the projector housing can slide either along a long axis of the waveguide or a short axis of the waveguide to cover the output optical element of the optical waveguide for the virtual reality display mode and to uncover the output optical element of the optical waveguide for the augmented reality display mode. Electrical and/or optical connections can be provided between the projector housing and the projector output element, which remain operationally coupled during the process of sliding the projector housing relative to the optical waveguide.

In the configurations discussed above, only one output optical element is discussed. This is appropriate for a monocular display device. For a binocular display device two output optical elements are provided. These can be provided as two outputs optical elements at opposed ends of an optical waveguide with the input optical element arranged between them. In such an arrangement the input image is directed from the same input optical element in two opposed directions through the optical waveguide. In an alternative configuration, two separate identical optical waveguides could be provided, each receiving the same input image from a single projector of from separate synchronized projectors.

Throughout this specification, plural instances may implement or replace components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims and equivalents thereof. The specification and drawings are, accordingly, to be regarded in an illustrative rather than a restrictive sense.

The invention claimed is:

1. A display device for use in displaying an augmented reality image of a real-world view or a virtual reality image to a user, the display device comprising:
an optical waveguide having an input optical element for receiving an image;
a projector for generating the image, the projector being physically coupled to the optical waveguide; and
a projector housing containing at least some components of the projector, the projector housing being moveable with respect to the optical waveguide, the projector housing containing the at least some components of the projector so that the image generated by the projector is fixed relative to the projector housing,
the projector including an image processor to correct the image generated by the projector and received by the input optical element of the optical waveguide dependent on a position of the projector housing relative to the optical waveguide.

2. The display device of claim 1, wherein the projector housing:
is rotatably attached to the optical waveguide; and
is rotatable with respect to the optical waveguide between a first relative position and a second relative position.

3. The display device of claim 2, wherein the projector housing is coupled to the optical waveguide to rotate about the input optical element.

4. The display device of claim 2, wherein the optical waveguide extends in a plane, and the projector housing is rotatable about an axis substantially normal to the plane of the optical waveguide.

5. The display device of claim 4, wherein the image processor correcting the image comprises correcting an orientation of the image.

6. The display device of claim 4, wherein the projector housing extends substantially parallel to the optical waveguide, and the projector housing is rotatable relative to the optical waveguide so that the projector housing remains substantially parallel to the optical waveguide.

7. The display device of claim 4, wherein the projector housing is rotatable about an axis substantially parallel to the plane of the optical waveguide.

8. The display device of claim 2, wherein the first relative position is at 90°, 180°, or 270° to the second relative position.

9. The display device of claim 2, wherein;
a projector output element of the projector is fixed to the optical waveguide separate from the projector housing;
the projector housing rotates relative to the projector output element; and
at least one optical coupling is provided between components in the projector housing and the projector output element.

10. The display device of claim 9, wherein the projector output element includes at least one optical component.

11. The display device of claim 1, wherein the optical waveguide and the projector housing are configured to enable the projector housing to move with respect to the optical waveguide by translation.

12. The display device of claim 11, wherein:
a projector output element of the projector is fixed to the optical waveguide separate from the projector housing;
the projector housing translates relative to the projector output element; and
at least one optical coupling is provided between components in the projector housing and the projector output element.

13. The display device of claim 12, wherein the projector output element includes at least one optical component.

14. The display device of claim 1, wherein the optical waveguide includes an output optical element configured to output the image.

15. The display device of claim 14, wherein at least one of the input optical element and the output optical element is a surface relief diffractive element.

16. The display device of claim 14, wherein the output optical element is adapted to output the image in a form that is expanded compared with a form of the image input to the input optical element from the projector.

17. The display device of claim 14, wherein the optical waveguide includes a least one intermediate optical element to receive the image from the input optical element and to output the image in an expanded form to the output optical element, where the output image is expanded compared with the form of the image input to the input optical element from the projector.

18. The display device of claim 14, wherein the projector is arranged to input the image to the input optical element on a first side of the optical waveguide, and the output optical element is arranged to output the image on a second side opposed the first side.

19. A method of displaying an augmented reality image of a real-world view or a virtual reality image to a user, the method comprising:

generating an image using a projector based on image data;

receiving the image at an input optical element of an optical waveguide;

outputting the image from at least one output optical element of the optical waveguide, the at least one output optical element occupying a region of the optical waveguide, the optical waveguide being physically coupled to the projector;

moving a projector housing with respect to the optical waveguide from a first relative position to a second relative position, the projector housing containing at least some components of the projector; and processing the image data to correct the image generated by the projector and received by the input optical element of the optical waveguide dependent on a position of the projector housing relative to the optical waveguide.

20. A device for displaying an augmented reality image of a real-world view or a virtual reality image to a user, comprising:

a projector for projecting an image;

an optical waveguide having an input optical element and at least one output optical element occupying a region of the optical waveguide, the optical waveguide being configured to receive the image and to output the image from the at least one output optical element; and a projector housing containing at least some components of the projector, the projector housing being moveable with respect to the optical waveguide, the projector housing containing the at least some components of the projector so that the image generated by the projector is fixed relative to the projector housing, the projector including an image processor to correct the image generated by the projector and received by the input optical element of the optical waveguide dependent on a position of the projector housing relative to the optical waveguide.

\* \* \* \* \*